Feb. 1, 1955 J. R. KEIM ET AL 2,701,270
MEASURING APPARATUS
Filed Jan. 17, 1952 2 Sheets-Sheet 1

INVENTORS.
ANTHONY ARROTT
JONATHAN R. KEIM
BY Arthur H. Swanson
ATTORNEY.

Feb. 1, 1955
J. R. KEIM ET AL
2,701,270
MEASURING APPARATUS
Filed Jan. 17, 1952
2 Sheets-Sheet 2
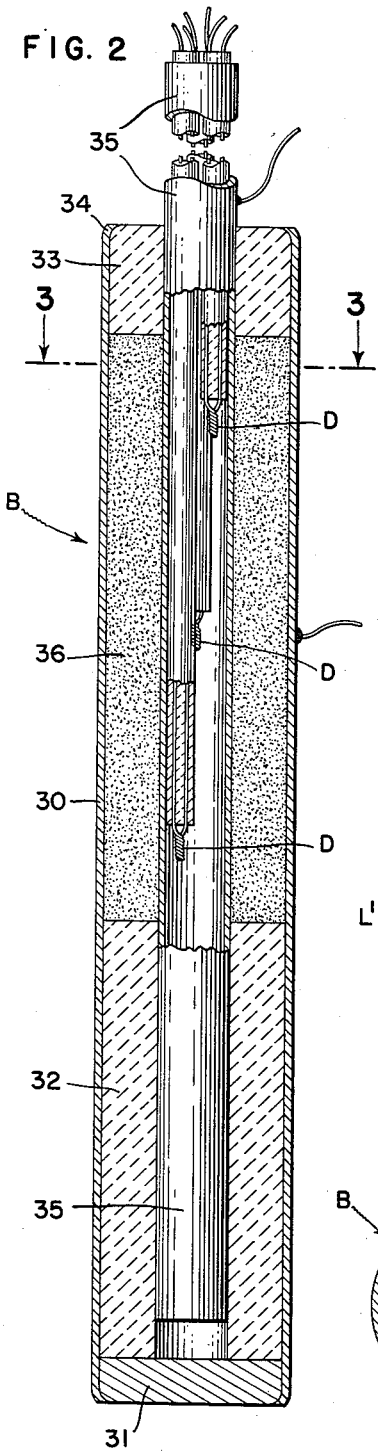
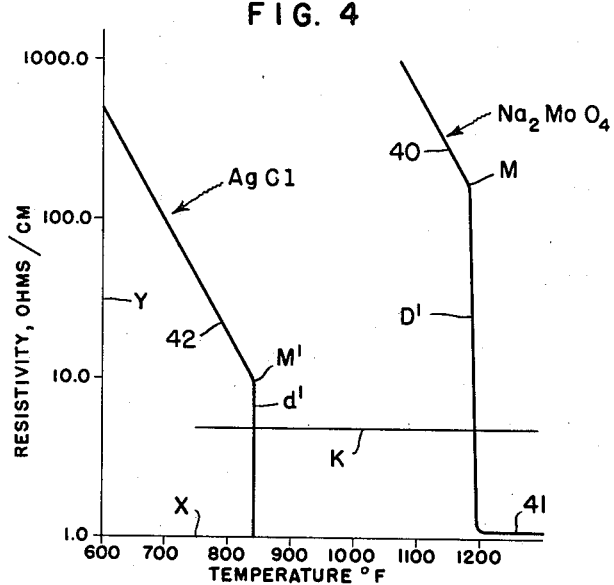
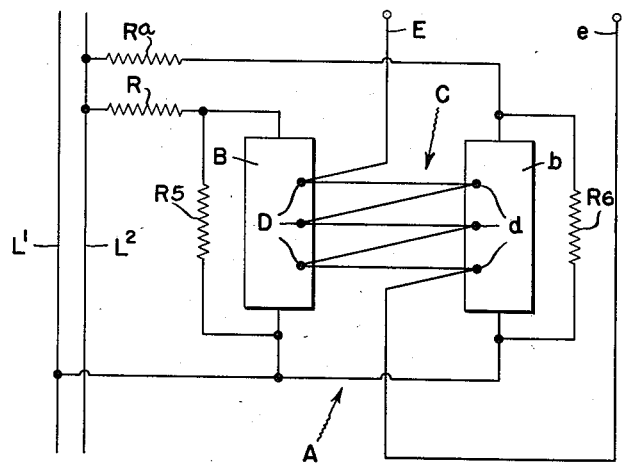
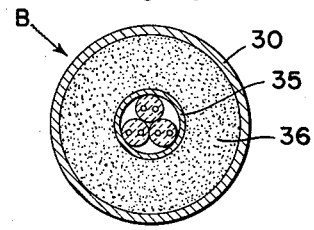
INVENTOR.
ANTHONY ARROTT
JONATHAN R. KEIM
BY Arthur H. Swanson
ATTORNEY.

United States Patent Office 2,701,270
Patented Feb. 1, 1955

2,701,270

MEASURING APPARATUS

Jonathan R. Keim, Philadelphia, and Anthony Arrott, Sewickley, Pa., assignors to Minneapolis-Honeywell Regulator Company, Minneapolis, Minn., a corporation of Delaware Application January 17, 1952, Serial No. 266,878

7 Claims. (Cl. 136—4)

The general object of the present invention is to provide a novel apparatus for producing an electric current of approximately constant magnitude. While not restricted to such use, the present invention may be used with especial advantage in supplying the small electric current required to energize conventional potentiometric bridge measuring circuits.

Such a circuit may be energized by a low voltage source of current of a few milliamperes. Heretofore, that current has usually been supplied by a dry cell having a voltage of 1½ volts or so, although such use of a dry cell is open to the long-recognized objection that the voltage of a dry cell diminishes progressively as the cell ages. To minimize the ageing disadvantage, it is general practice to provide measuring instruments having dry cell energizing circuits with rheostatic means for recalibrating the energizing circuits continuously, or at frequent intervals.

A primary object of the present invention is to provide novel and effective means for producing an electric current suitable for use in energizing bridge circuits of the above mentioned type, and suitably constant to make unnecessary the frequent recalibrations of such a circuit heretofore customary. More specifically stated, the primary object of the invention is to combine two fusible salt resistor elements, maintained at suitably different temperatures, with a thermocouple or thermopile which is responsive to the difference between the temperatures of the two resistors and forms the voltage source of a substantially constant bridge energizing current.

In the preferred form of the present invention, we connect the two fusible salt resistor elements in parallel with one another and each in series with a separate ballast resistor across a common voltage source passing current to each resistor to heat the latter to its respective working temperature. The resistance of each of the ballast resistors may well be several times the resistance of the cooler fusible salt resistor when at its working temperature.

When suitably formed and proportioned fusible salt resistors are connected across a current source passing current through the resistors to heat the latter to suitable working temperatures, moderate variations in the voltage of the last mentioned current source may occur without producing significant changes in the temperatures of the fusible salt resistors, because of a self-regulating action of each fusible salt resistor when in its working temperature range. That range must be one in which the fusible salt resistor is at a melting or solidifying temperature at which the fusible salt is being converted from one to the other of its solid and liquid phases; or is in a transition temperature range in which a modification in the crystalline form of the salt occurs. Not every fusible salt resistor is of such composition as to have a definite transition temperature range lower than its melting temperature.

A fusible salt resistor is characterized by the relatively wide variation in its resistance produced by a relatively small change in the temperature of the resistor when that temperature is within its melting range or within a definite transition range.

The above mentioned self-regulating temperature action of such a resistor results from the fact that a small increase or decrease in the temperature of the resistor results in a relatively large decrease or increase, respectively, in the resistance of the resistor. Thus, when a decrease in the supply voltage diminishes the heating current and thereby tends to diminish the resistor temperature while materially increasing the resistance of the resistor, the increase in resistor resistance increases the heating effect of the diminished heating current and thus compensates to a substantial extent for the effect on the resistor temperature of the decrease in the supply voltage. Similarly, when the supply voltage increases, the resultant decrease in the resistance of the resistor substantially compensates for the effect on the resistor temperature of said voltage increase.

The various features of novelty which characterize our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described a preferred embodiment of the invention.

Of the drawings:

Fig. 2 is a sectional elevation of a fusible salt resistor shown in Fig. 1;

Fig. 3 is a cross section taken along the line 3—3 in Fig. 2;

Fig. 4 is a diagram illustrating temperature and resistance relations of fusible salt resistors of different compositions; and Fig. 5 is a diagrammatic view illustrating a modification of the fusible salt resistor and thermopile arrangement shown in Fig. 1.

Figure 1:
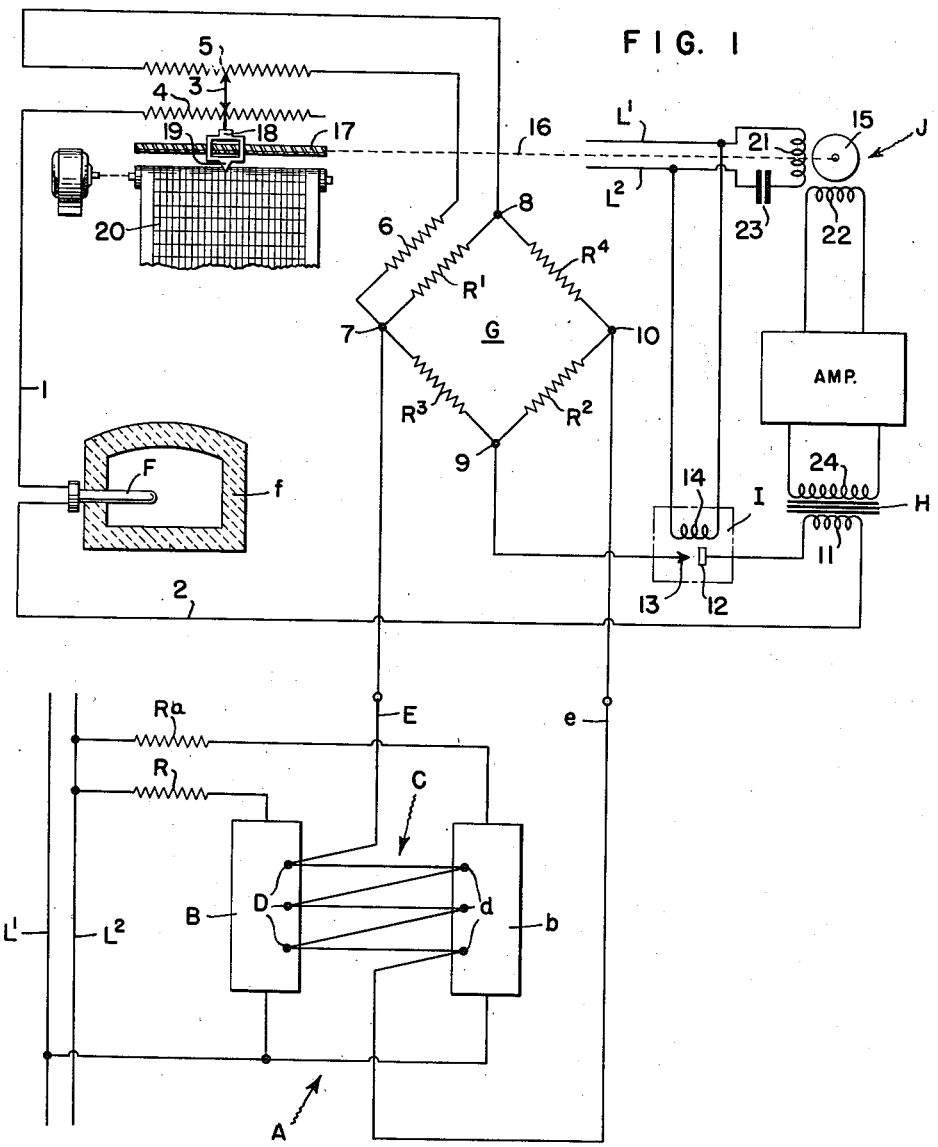
Fig. 1 is a diagrammatic view illustrating one form of embodiment of the present invention.

In the embodiment of the invention illustrated diagrammatically in Fig. 1, A designates a constant current supply source including two sources of approximately constant temperature comprising two salt resistors B and $b$. The resistors B and $b$ are connected in parallel with one another, each in series with a respective ballast resistor R and R$a$ across supply conductors L' and L$^2$. The conductors L' and L$^2$ may be connected to a suitable source of direct current, but preferably are connected to a source of alternating current which may be of conventional frequency and voltage, as, for example, 60 cycles per second and 115 volts. As is hereinafter more fully explained, the resistors B and $b$ are so formed and arranged that in normal operation the resistor B has a pretermined and approximately constant temperature which exceeds the predetermined and approximately constant temperature of the resistor $b$ by a suitable amount. That amount may be as great as, or greater than, 400° F., in some cases, and in other cases may be as small as, or smaller than, 100° F.

In Fig. 1, a thermopile C is shown as comprising three hot junctions D and three cold junctions $d$ connected in series between terminal conductors E and $e$. The hot junctions D are exposed to, and maintained at or near, the temperature of the fusible salt resistor B, while the cold junctions $d$ are exposed to, and maintained at or near, the temperature of the resistor $b$.

In Fig. 1, we have diagrammatically illustrated the use of the constant current supply source A in an apparatus for measuring and recording the varying temperature of a thermocouple F within a furnace $f$, and having terminal conductors 1 and 2. The apparatus shown by way of example in Fig. 1 for measuring and recording the temperature of the thermocouple F is of the known type and form disclosed in the Brooks Patent 2,312,022 of February 23, 1943. The voltage developed by the thermocouple F is applied to the terminals of a potentiometric bridge measuring circuit G, and is balanced by the voltage in a portion of the measuring circuit including a wiper contact element 3 which engages and is adjustable along each of two side-by-side slide-wire resistors 4 and 5. The positive terminal of the thermocouple F is connected by the terminal conductor 1 to one end of the slide-wire resistor 4, and the slide-wire resistor 5 is connected in series with a resistor 6 across a resistor R' which forms one of the four arms of the bridge circuit G.

A resistor R$^3$, forming a second arm of the bridge circuit G, has one end connected to one end of the resistor R' at a bridge junction 7. A resistor R$^4$, forming a third arm of the bridge G, has one end connected to the second end of the arm R' at a bridge junction 8. A resistor R², forming the fourth arm of the bridge circuit G, has one end connected to the second end of the arm R³ at a bridge junction 9. The second end of the arm R⁴ is connected to the second end of the fourth bridge arm R² at a bridge junction 10. The thermopile terminals E and e are respectively connected to the junctions 7 and 10 of the bridge circuit G.

The second terminal 2 of the thermocouple F is connected to one terminal of the primary winding 11 of a transformer H. The second terminal of the winding 11 is connected to the contact 12 of a current interrupter I. The second contact 13 of the interrupter I is connected to the bridge junction 9. The contacts 12 and 13 are given vibratory movements toward and away from one another, by an electro-magnetic vibrator having an actuating winding 14, at the frequency of the voltage across the alternating current supply conductors L' and L² to which the terminals of the winding 14 are connected.

The contact member 3 is adjusted along the slide-wire resistors 4 and 5, on and in accordance with variations in the voltage of the thermocouple F, by a reversible two phase motor J. As shown, the rotor 15 of the motor J has its shaft 16 connected to a threaded element 17 alongside the slide-wire resistors 4 and 5, and the rotation of the member 17 adjusts a carriage 18 longitudinally of the threaded shaft 17. The carriage 18 supports and adjusts the wiper contact member 3. As shown, the carriage 18 also carries a recording element 19 for recording the varying voltage of the thermocouple F on a record chart 20. The rotor 15 is given its rotative movements by a power winding 21 and a control winding 22. The power winding 21 is connected in series with a condenser 23 across the alternating current supply conductors L' and L². The control winding 22 is connected in the output circuit of an amplifier AMP having an input circuit which includes the secondary winding 24 of the transformer H.

In operation, the periodic engagement and separation of the interrupter contacts 12 and 13 operate to convert unbalanced direct current, flowing through the circuit including the junctions 8 and 9 of the bridge G, the transformer primary winding 11, and the thermocouple F, into pulsating currents. Those currents flow through the transformer primary winding 11 in one direction or in the opposite direction, depending upon the direction of potentiometric unbalance. The pulsating current flow through the primary winding 11 induces an alternating current flow in the secondary winding 24 of the transformer which is of one phase or of opposite phase depending upon the direction of said pulsating current flow. The alternating current induced in the secondary winding 24 is impressed on the input circuit of the amplifier AMP, and the amplified output current of the amplifier is passed through the control winding 22 of the motor J. When the motor winding 22 is energized, it cooperates with the motor winding 21 to effect rotation of the rotor 15 of the motor J in the direction required to rebalance the measuring system and thus interrupt the pulsating current flow through the primary winding 11.

In Fig. 2, we have illustrated, by way of example, one practical form of construction of the fusible salt resistor element or unit B of Fig. 1. As shown in Fig. 2, the resistor comprises an outer metallic shell 30 closed at one end by a metal plug or closing device 31. The parts 30 and 31 may each be formed of stainless steel. The element B is shown in Fig. 2 in the vertical condition in which it is assembled, with the part 31 at the lower end of the element. Loosely received in the lower portion of the shell 30 is a tubular spacing insulator 32. An insulating bushing 33 is anchored in the upper end of the shell 30 by spinning or knurling the thin upper edge 34 of the shell into snug engagement with the bushing. The outer shell 30 serves as one electrode of the element B and its other electrode is formed by a hollow tubular body 35 of metal which may well be stainless steel and in which, as illustrated, the thermopile junctions D are suitably mounted. In order to electrically insulate the thermopile junctions from the inner metallic walls of the tube 35 while maintaining close thermal contact therewith, suitable electrical insulating material such as known ceramics may be employed. As shown, the conducting leads for the thermopile junctions may all be brought out through the top of the tubular body 35. The space within the shell 30 and surrounding the electrode 35 may be initially filled with powdered fusible salt 36, for example, sodium molybdate, Na₂MoO₄. The bushing 33 is ordinarily anchored in place in the upper end of the shell 30 after the rest of the resistor unit has been assembled and the fusible salt material 36 has been poured into the annular space surrounding the electrode 35 and above the spacer element 32.

In practice, the shell 30 may have an outside diameter of 5" and a wall thickness of .035", while the inner tubular electrode 35 may be a tube plugged at one end, and having an internal diameter of .25". The insulating parts 32 and 33 may be formed of lava and fired at a temperature of 2070° F. The sodium molybdate powder may be formed by first fusing sodium molybdate in a crucible to remove water, and then crushing the fused material to form powder particles of suitably small size.

In assembling the resistor unit shown in Fig. 2, spacing insulator 32 is put in place in the tube 30 and the electrode 35 is then positioned in the spacer, after which the powdered salt 36 is poured into the space within the shell 30 not occupied by the spacer 32, electrode 35, and insulating bushing 33, after which the end 34 of the tube 30 is knurled or spun into gripping contact with the bushing 33. The proper assembly of the unit is facilitated by so proportioning the free powder-receiving space that the latter will be filled when the proper amount of powdered salt is poured into said space. That amount may well be about 10 grams when the salt is sodium molybdate. When the assembled unit is thereafter heated up to melt the salt and then cooled to re-solidify the salt, the volume of the latter diminishes, leaving an air space which receives the air eliminated from the solidified salt mass.

The assembly unit shown in Fig. 2 may advantageously be prepared for use by heating it in a furnace at 1400° F. or so, which is well above the melting point of the salt. Thereafter, the unit is removed from the furnace and allowed to cool, while in an inverted position, so that the molten salt will run down and seal around the insulating bushing 33 before solidifying. In normal service, the mounting end of the unit shown in Fig. 2 at which the electrode 35 protrudes from the shell 30 and bushing 33 will be maintained at a temperature sufficiently lower than the full melting temperature of sodium molybdate, or other fusible salt material, to prevent the salt seal in contact with the bushing from melting, thus making the fused salt seal effective.

The resistor elements B and b of Fig. 1 may each have the structural form of the resistor element B shown in Fig. 2, but when the two fusible salt resistor elements to be maintained at different temperatures are alike in structure and dimensions, and are heated in the manner shown in Fig. 1, the fusible salt constituents of the two resistors must be different. In such a case, for example, the fusible salt constituent of the resistor b may well be silver chloride, AgCl, while the fusible salt constituent of the resistor B is sodium molybdate. The diagram shown in Fig. 4 illustrates temperature and resistance relations of such fusible salt resistors b and B when arranged for conjoint use in the manner illustrated in Fig. 1.

In the Fig. 4 diagram, the abscissa numerals 600°–1200° distributed along the horizontal line X represent temperatures in degrees Fahrenheit, and the ordinate numerals 1–1000 distributed along the vertical line Y represent resistivities in ohms per centimeter cube, or, more briefly, ohms per centimeter, on a log scale. As is well known, the resistance of a fusible salt resistor increases in accordance with a logarithmic scale in more or less direct proportion to linear scale changes in the temperature of the resistor as the latter varies through a definite transient temperature range between its melting temperature and a temperature at which the crystalline character of the salt begins to change as the temperature of the resistor is decreased. In Fig. 4, the horizontal line K represents the similar resistances of the sodium molybdate resistor B and the silver chloride resistor b when those resistors are at their assumed respective normal working temperatures of slightly below 1200° F. and about 840° F., and have substantially the same assumed resistances of about 4 ohms. In Fig. 4, the inclined line 40 indicates the temperature and resistance relation of the sodium molybdate resistor B as its temperature progressively diminishes below the melting temperature M of the resistor B. As shown, the resistance of the resistor B diminishes as the temperature of the resistor builds up to the melting temperature M. Thereafter, the resistance of the resistor B diminishes with practically no change in temperature until all the salt is fully melted, as is shown by the line D'. Thereafter, the molten sodium molybdate may be heated to further increase its temperature, with only a slight decrease in the resistance of the resistor, as is indicated by the line 41.

In Fig. 4, the silver chloride fusible salt resistor $b$ is assumed to have a resistance of about 10 ohms when its initial melting temperature of 840° F. at the point M' is attained. As the melting of the resistor $b$ progresses, its resistance decreases from 10 ohms to less than 1 ohm without significant change in temperature, as shown by the line $d'$. The resistance and temperature relation of the resistor $b$ when its salt content is melted and heated to increase its temperature above 840° F. is not shown in Fig. 4. In Fig. 4, the inclined line 42 illustrates the temperature and resistance relation of the silver chloride resistor $b$ through a transition temperature range below 840° F. In Fig. 4, the horizontal line K represents the normal working resistances of the resistors $b$ and B when at their melting temperatures, at which the resistance value of each resistor is about 4 ohms.

In the practical application of the fusible salt resistor and thermopile arrangement illustrated in Figs. 1–3, it may be necessary in some applications to initiate the operation of the apparatus by applying an external source of heat to the fusible salt resistors in order to bring their temperatures up to their normal operating range. The need for such an externally applied source of heat is especially apparent when fusible salt resistors are employed which exhibit very high resistivities at ordinary room temperatures.

While it is to be understood that the external source of heat may be applied in any suitable manner to the fusible salt resistors, we have illustrated in Fig. 5 one practical and convenient way in which this result may be accomplished. Thus, in Fig. 5, a heating resistor R5 is arranged in association with the fusible salt resistor B and a similar heating resistor R6 is arranged in association with the fusible resistor $b$. The heating resistors R5 and R6 may be arranged in any suitable manner to accomplish the desired initial heating of their associated fusible resistors B and $b$ and, by way of example, they may each be wrapped around their said associated resistor, being suitably insulated in a suitable manner from the stainless steel shell of the fusible salt resistors.

While, in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims, and that in some cases certain features of our invention may be used to advantage without a corresponding use of other features.

Having now described our invention, what we claim as new and desire to secure by Letters Patent is:

1. Apparatus for deriving an electric current of high constancy from an electric current source subject to substantial variations in supply voltage, comprising two fusible salt resistors with terminal conductors for connecting each resistor to said source of current thereby to heat said resistor to a temperature differing by a predetermined amount from the temperature to which the other resistor is heated by said source, and to heat each resistor to a temperature in the temperature range in which that resistor changes between its solid and liquid phase, and heat responsive, electric potential producing means exposed to the temperatures of both of said resistors, and operative to produce a direct current potential varying in accordance with the difference between the temperatures of said resistors.

2. Apparatus as specified in claim 1, in which the temperature to which each resistor is heated is in a predetermined portion of the temperature range in which that resistor changes between its solid and liquid phases.

3. Apparatus as specified in claim 1, including a ballast resistor and in which said salt resistors are connected in parallel with one another and each in series with a ballast resistance across the source of resistor heating current.

4. Apparatus as specified in claim 1, in which said resistors include fusible salt materials having different melting temperatures.

5. Apparatus as specified in claim 1, in which each resistor develops a temperature different from a temperature developed by the other resistor, and in which a direct current potential is produced by a thermopile having its hot junction temperature dependent on one of the first mentioned temperatures and having the temperature of its cold junctions dependent on the second of the first mentioned temperatures.

6. Apparatus as specified in claim 1, including a separate heating resistor associated with each of said fusible salt resistors to heat initially the fusible salt resistors to their normal operating range.

7. Apparatus for deriving a potential of high constancy from a commercial current source notwithstanding substantial variations in the voltage of said current source, comprising two fusible salt resistors with terminal conductors for connecting said resistors in parallel with one another to a source of current and arranged thereby to be heated to predetermined different temperatures, and heat responsive, electric potential producing means exposed to the temperatures of said resistors, and operative to produce a potential varying in accordance with the difference in temperature of said resistors.

References Cited in the file of this patent

UNITED STATES PATENTS

| Number | Name | Date |
|---|---|---|
| 1,379,721 | Rapelye | May 31, 1921 |
| 2,312,022 | Brooks | Feb. 23, 1943 |
| 2,463,944 | Borden | Mar. 8, 1949 |
| 2,595,814 | Rich et al. | May 6, 1952 |

FOREIGN PATENTS

| 181,504 | Great Britain | June 19, 1922 |